Feb. 11, 1958  A. SILVERMAN  2,822,579
METHOD OF MAKING GLASS FILAMENTS
Filed March 30, 1953  2 Sheets-Sheet 1

INVENTOR
ALEXANDER SILVERMAN
BY
ATTORNEY.

United States Patent Office 2,822,579
Patented Feb. 11, 1958

2,822,579

METHOD OF MAKING GLASS FILAMENTS

Alexander Silverman, Pittsburgh, Pa.

Application March 30, 1953, Serial No. 345,475

2 Claims. (Cl. 18—47.3)

This application is a continuation-in-part of application Serial No. 268,871, filed January 29, 1952, now abandoned.

In the aforementioned application I have described a method of forming glass shapes, such as rods or fibers, by molding a rod composed of bonded discrete particles either of glass-forming oxides, which on fusion produce the glass, or particles of the glass itself. Suitable binders may be used. This material may be extruded to form rods and the rods sintered or otherwise hardened. The rods are passed into a heating zone where they are melted to form a homogeneous melt of the glass. This molten filament of the glass may then be drawn into a thread or blasted into threads.

Where the filaments are formed by a blasting operation, it is desirable that the individual particles, particularly if the glass is a multi-component glass, i. e., a fusion of a plurality of oxides or salts, forming the rod all have the same chemical composition. By using such particles I avoid the danger of segregation of the glass mixture into phases of different melting points prior to total fusion of the shaped mass. This prevents the segregation of the material into a solid, fused, or partially fused phase. This is particularly important where the multi-component glass is composed of a plurality of oxides or salts which are capable of forming a plurality of compounds or complexes of diverse melting points. By employing particles all of which have the same chemical composition, I avoid the above deleterious effects of phase separation.

In forming glass fibers or filaments from the molten rod, as described above and in my co-pending application Serial No. 268,871, especially when the method of forming the fibers is by blasting the molten strand with a blast of hot gases, it is desirable to employ, in forming the molten rod, particles of preformed glassy material. This is true whether employing a glass formed of a single glass-forming oxide or salt or a multi-component glass formed of a plurality of glass-forming oxides or salts.

It is thus an object of my invention to form glass filaments from a molded rod composed of individual particles each of which has the same chemical composition.

It is a further object of my invention to form glass particles by fusing the chemical components of the glass into a melt and form small glass particles therefrom, mold the glass particles into a rod of sufficient mechanical strength to be passed into a heating zone and to melt the rod, and form fibers from the molten rod.

Figure 1:
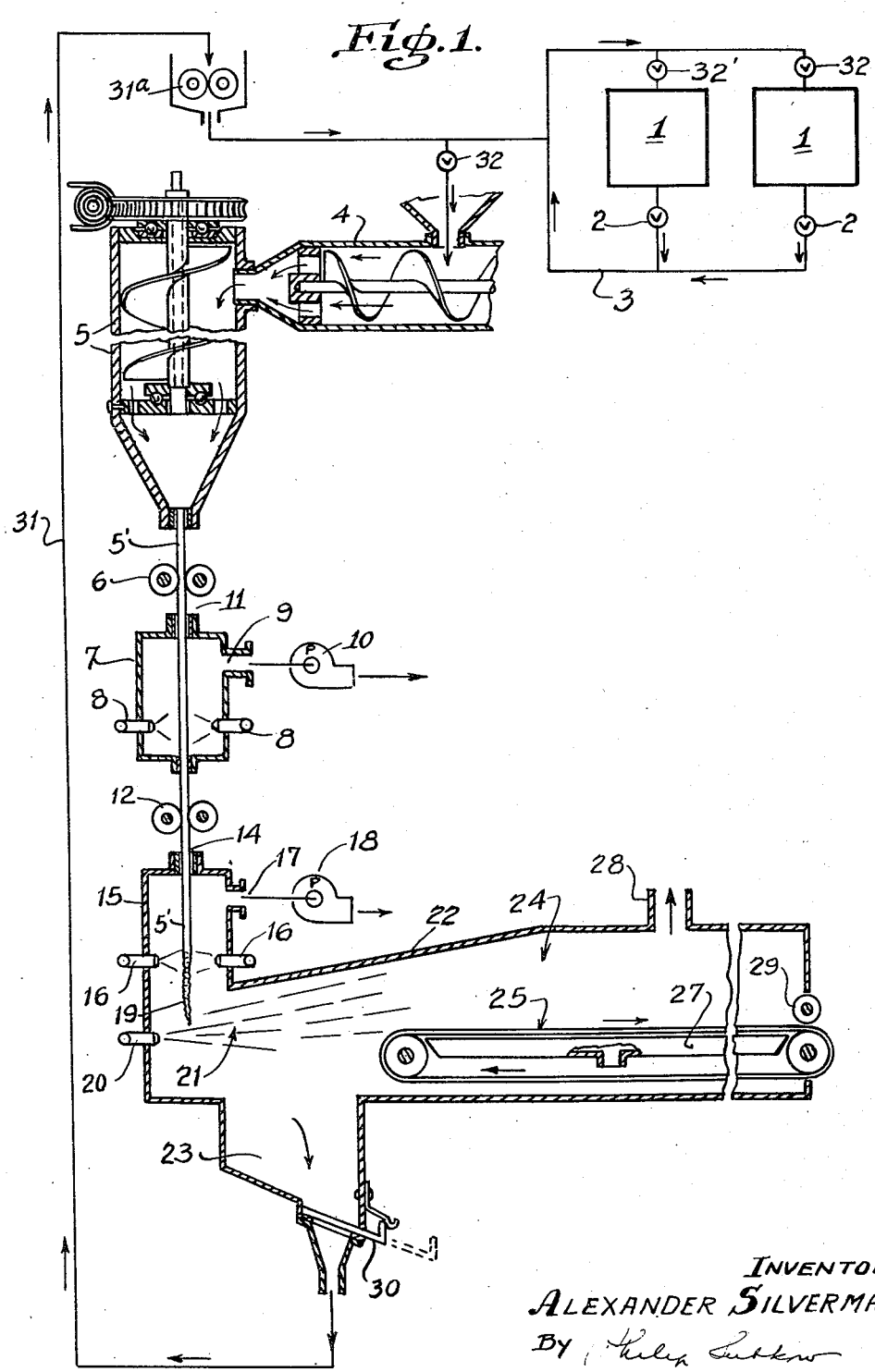
Figure 2:
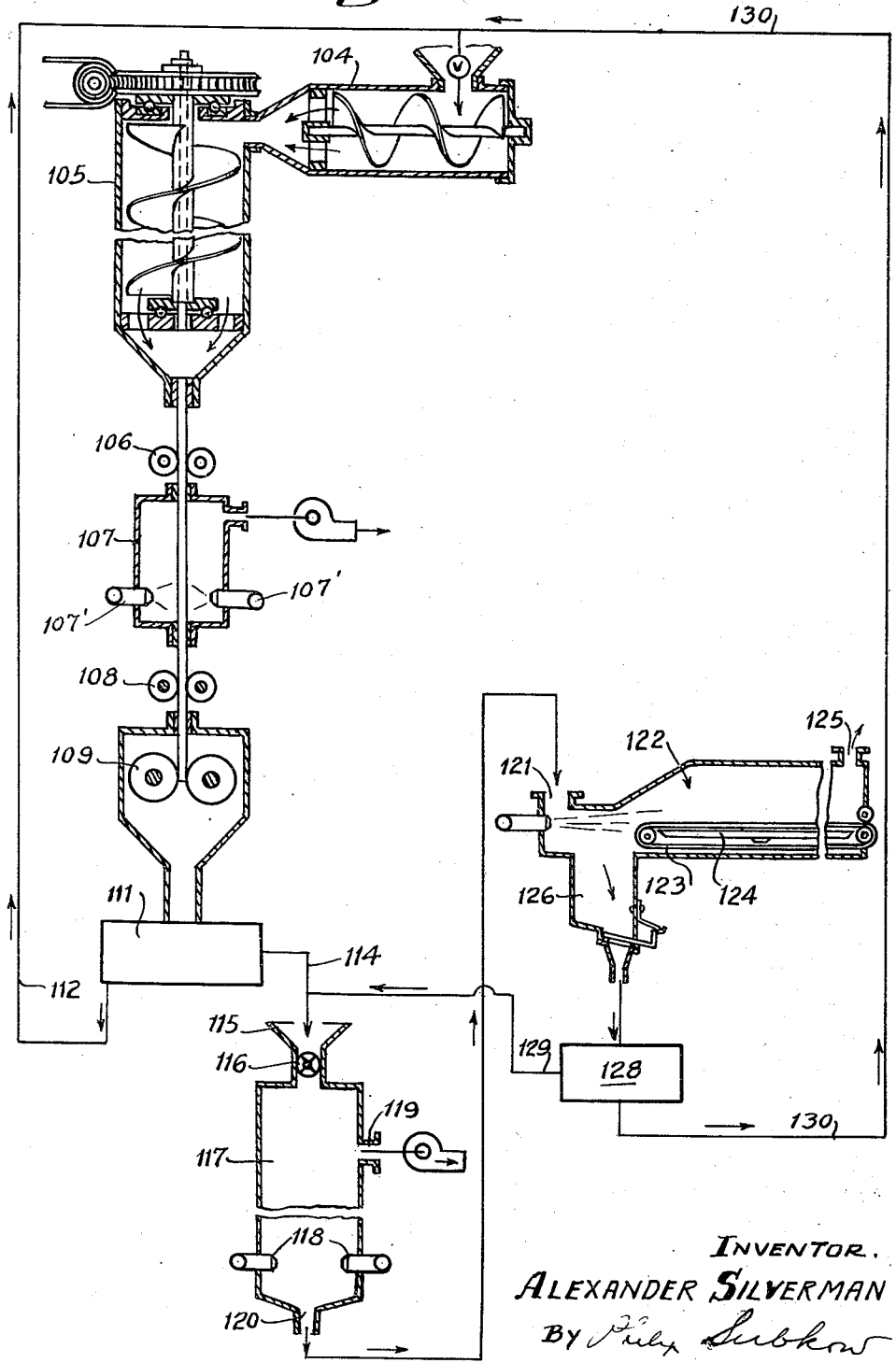

These and other objects of my invention will be further described in connection with the drawings, in which Fig. 1 is a schematic flow sheet of one form of my process; and Fig. 2 is a schematic flow sheet of another form of my process.

Material in hopper 1 is passed via valves 2 and conveyers 3 into mixer 4 and extruder 5. The extruded rod, which may range from ¼ to ⅟₁₆ of an inch in diameter, is passed by feeder rolls 6 which grip the rod and on rotation advance the extruded rod into the furnace 7.

The furnace 7 is heated by burners 8. The products of combustion exit through 9. Suitable suction may be created in furnace 7 by means of a hot gas blower 10 to prevent hot gas from escaping through the opening 11 through which the rod enters. In passing through the furnace 7, the rod is heated to a temperature of about 500° to 1700° F. whereby it is cured, sintered, and hardened. The rolls 6 are rotated, one clockwise and the other counter-clockwise, by suitable drive mechanism not shown.

Rolls 12, driven similarly to rolls 6, move the sintered rod through the opening 14 of the furnace 15. In this furnace, the rod is heated by burners 16 to raise the rod 5' above the melting point of the glass particles sufficiently to give a molten glass of the proper viscosity. The products of combustion exit through 17, pumped, if desired, by the hot gas suction fan 18.

The liquid glass 19 is blasted with gas, air, or steam under high pressure, entering through the nozzle 20; alternatively, the nozzle 20 may be a burner and the liquefied glass may be blasted with high velocity, hot combustion gases.

The gases transform the liquid glass into fibers or filaments and also into particles or granules in non-filamentary form. The particles and fibers are carried by the gas stream through the throat 21 of the tunnel 22. The heavier glass particles drop out of the stream into the hopper 23 while the fibers are carried further into the tunnel until they reach the space 24 where they drop out and are deposited on the foraminous belt 25. The belt is moved in the direction of the arrows over the suction box 27.

The glass particles and fibers as they enter the tunnel have lost sufficient temperature, due to radiation and convection, to become congealed and then deposit as solid glass particles in the hopper 23 and as solid filaments on the belt 25. The fibers are deposited as a felt or batt on the belt, and as they exit the tunnel on the belt they are compacted by a roller 29. A gas outlet 28 and suitable seals at the belt where it exits from the tunnel permit the discharge of gas or steam through the gas outlet 28.

The glass particles in 23 are removed through a door 30 and returned by a conveyer 31 either into 4 or into 1, suitable valves 32 and 32' being provided for this purpose. If the particles are too coarse, they may be passed through a grinder 31a before passing into the mixer 4.

Glass masses ground to a fine powder of 200 mesh or finer contained in 1 are intermixed with a binder and the mixture extruded.

Fig. 2 shows an alternative procedure in which the glass particles are made by fragmenting the shaped article, as, for example, by grinding up a rod formed by extruding an intimate mixture of separate particles of glass-forming oxides and salts which, when fused together, will form the desired glass. The heterogeneous mixture of fine particles (200 and finer mesh) is mixed with a binder and extruded to form a rod. I may use the oxides and salts referred to above and the binders referred to above. The intimate mixture is extruded from extruder 105 and passed by rollers 106 through the furnace 107, and heated in the furnace by burners 107' in the manner similar, and to the temperatures similar, to that described for the operation in furnace 7 of Fig. 1.

The sintered and hardened rod is passed by rollers 108, through crushing rolls 109, where the rod is broken into coarse granules of considerably greater size than the fine particles of the material extruded from 105. These granules have substantially the same chemical composition as the mixture in 105, omitting, however, the water evaporated in 107.

The crushed granules pass onto screens 111 where the particles are separated into particles of various sizes and pass through conveyer 112, back to the mixer extruder 105. The coarser granules which have particle sizes greater than those passing from 1 or 31' are passed by the conveyer 114 through the feeder hopper 115 controlled by the rotary valve 116 into the top of the furnace 117. Hot combustion gases from burners pass upward through the furnace to discharge from the flue 119. The fines are returned via conveyer 130 to the original mix passing to the extruder. In falling through the furnace the granules are preferably completely fused into molten homogeneous liquid glass droplets. The gas velocity and temperature in the furnace preferably are controlled so that such melting is accomplished with substantially no elutriation through 119. The molten glass droplets drop through the exit throat 120 into the blast of gases, steam, or air through the nozzle 121 and are converted into solid filaments which, together with any particles of non-filamentary gas, are carried with the stream of gas into the tunnel 122. As they enter the tunnel they have dropped in temperature so that solid glass filaments deposit on the belt 123 passing over the suction box 124. The gases exit from 125. Non-filamentary, solid particles drop out from the gas stream into hopper 126 and are screened in screen 128. The coarse granules are returned via conveyer 129 to hopper 115 and are passed into the shaft furnace 117 while the finer particles of size not suitable for passage to the shaft furnace 117 are returned to the mixer and extruder via conveyer 130.

Examples of the glasses which may be processed according to my invention are given below, not by way of limitation, but as illustrative of my invention. In operating the process according to the procedures of Fig. 1, the glasses are formed in any desired fashion and the glasses ground to the desired mesh, as described above, and the particles mixed with the binder and extruded into rod form. In operating according to the form illustrated by Fig. 2, the glasses are formed by first mixing the individual glass forming oxides or salts which on melting give the glasses desired. Thus, in the following examples where I give the glass formula used in the form illustrated by Fig. 1, it will be understood that the individual components of the glass may be mixed as discrete particles when using the procedure of Fig. 2, and vice versa, where I give the mixture in terms of the individual oxides or salts components of the glass, it will be understood that in operating according to Fig. 2, these are mixed as discrete particles of separate oxide or salt ingredients. Note, however, in this case care is to be taken of the recirculation of fused glass particles to be admixed with the glass forming ingredients in the form of Fig. 2 as well as in the form of Fig. 1. Binders are described for use in binding the particles and it will be understood that they are used in the forms of the invention illustrated by Fig. 1 and Fig. 2.

Various glasses of many different compositions may be processed by the procedure illustrated above. Various glass compositions suitable for use in the above procedure are described in the Nordberg Patent No. 2,461,841 and in the Parker et al. Patent No. 2,491,761. Other glasses suitable for such use are described in my co-pending application Serial No. 268,871.

I may use calcium aluminate glass wherein CaO and $Al_2O_3$ are in equimolar quantities or alumino silicate glass containing 2.05 parts by weight of $Al_2O_3$ to one part by weight of $SiO_2$. I may employ calcium silicate glasses or barium phosphate-barium fluoride glasses, for example, 10.36 parts of $Ba_3(PO_4)_2$ and one part of $BaF_2$.

For example, I may make a mixture of 200 parts by weight of kaolin, 30 parts by weight of $Al_2O_3$, and 2 parts by weight of calcined borax. I may mix therewith 3 parts by weight of dry wheat paste and 4 parts by weight of $Na_2SiO_3$. The well mixed mixture is mixed with water to be a good plastic mix and extruded. The extruded rod is heated to a temperature of about 700° C. in furnace 107 and further processed as described. Where I use the glass particles, the glass has the previous composition and the glass particles are mixed with the wheat paste and extruded and processed as described.

The above procedure may also be followed using the following composition: 80 parts $SiO_2$, 40 parts CaO, 10 parts MgO, 35 parts boric acid, 100 parts kaolin, and 4 parts dry wheat paste, and mixed with water to a plastic mass. The material is sintered at a temperature of about 700° C. in furnace 107 and processed as described.

I may also use a mixture of 50 parts $CaSiO_3$ and two parts of dry wheat paste or, in the alternative, may use equivalent amounts of CaO and $SiO_2$ in place of the calcium silicate. The material mixed with water to a plastic mass is extruded and sintered at a temperature of about 1400° C. to 1700° C. to form the rod and processed as described above.

I may employ a mixture of 50 parts of talc and 3 parts of dry wheat paste mixed with water to a plastic mass and extruded and heated in 107 to a temperature of about 1400° C. to harden the rod and processed as described above.

I may employ 20.4 parts of $Al_2O_3$ and 20 parts of silica and 1 part of calcined borax and 1 part of dry wheat paste, heated in 107 to the rod and process the material as described above.

Instead of a mixture of glass forming oxides, I may employ a single glass forming oxide, for example, 100 parts of silica and 25 parts of flour and the mixture mixed with water, extruded and heated in 107 to a temperature of about 1400° C. to harden the rod. I process the material as described above.

Instead of wheat paste or flour, I may use an inorganic binder such as V gum sold by R. T. Vanderbelt & Co. V gum is a complex colloidal magnesium alumina silicate having the following composition: $SiO_2$, 61.1%; MgO, 13.7%; $Al_2O_3$, 9.3%; CaO, 2.7%; $Na_2O$, 2.9%; $H_2O$, 7.2%. In employing this material I may conveniently use an amount sufficient to bind the solid mixture. I have found about 1 to 2%, for example, 1½% of the V gum based on the weight of anhydrous solids used is a useful percentage. I may thus replace the wheat paste or flour in the above composition by V gum as specified above.

Instead of V gum, I may, where I employ any material having an $Al_2O_3$ content, employ as a binder orthophosphoric acid, or its salts, for example, calcium orthophosphate as a binder.

Thus, I may use 200 parts of kaolin; 5 parts of calcined borax, and 5 cc. of 85% phosphoric acid mixed with water sufficient to form a good plastic mass, and process the same as described above.

While I have described particular embodiments of my invention for purposes of illustration, it should be understood that various modifications and adaptations thereof may be made within the spirit of the invention as set forth in the appended claims.

I claim:

1. A method of forming glass filaments which comprises forming a mixture of particles of glass-forming material, extruding the resultant mixture into a coherent shape, heating said shape to a temperature sufficient to cure and harden said shape, breaking said hardened shape into fragments of a size greater than the particle size of said glass-forming material, heating said fragments to a temperature sufficient to convert them to liquid glass droplets, and attenuating said liquid glass droplets to form glass filaments.

2. A method of forming glass filaments which comprises forming a mixture of particles of glass-forming material, extruding the resultant mixture to form a rod, heating said rod to a temperature sufficient to cure and harden it, breaking said hardened rod into fragments of a size greater than the particle size of said glass-forming material, heating said fragments to a temperature sufficient to convert said fragments to liquid glass droplets, and blasting said droplets with a stream of high velocity gas to form glass filaments.

References Cited in the file of this patent

UNITED STATES PATENTS

| | | |
|---|---|---|
| 1,874,799 | Peiler | Aug. 30, 1932 |
| 2,278,092 | Pearce | Mar. 31, 1942 |
| 2,313,296 | Lamesch | Mar. 9, 1943 |
| 2,369,605 | Powell | Feb. 13, 1945 |
| 2,403,740 | Muench | July 9, 1946 |
| 2,450,363 | Slayter et al. | Sept. 28, 1948 |
| 2,566,252 | Tooley et al. | Aug. 28, 1951 |
| 2,585,496 | Powell | Feb. 12, 1952 |
| 2,594,799 | Powell | Apr. 29, 1952 |

FOREIGN PATENTS

| | | |
|---|---|---|
| 610,845 | Great Britain | Oct. 21, 1948 |